(12) United States Patent
Chang et al.

(10) Patent No.: US 12,030,462 B1
(45) Date of Patent: Jul. 9, 2024

(54) ASSEMBLY STRUCTURE OF WINDSHIELD WIPER

(71) Applicant: DANYANG UPC AUTO PARTS CO., LTD., Jiangsu (CN)

(72) Inventors: Che-Wei Chang, New Taipei (TW); Cheng-Kai Yang, New Taipei (TW); Chuan-Chih Chang, New Taipei (TW)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 18/133,445

(22) Filed: Apr. 11, 2023

(51) Int. Cl.
*B60S 1/38* (2006.01)
*B60S 1/40* (2006.01)

(52) U.S. Cl.
CPC ........... *B60S 1/3853* (2013.01); *B60S 1/3851* (2013.01); *B60S 1/3867* (2013.01); *B60S 1/3868* (2013.01); *B60S 1/4003* (2013.01); *B60S 1/4009* (2013.01); *B60S 1/4016* (2013.01)

(58) Field of Classification Search
CPC .... B60S 1/3858; B60S 1/3849; B60S 1/3851; B60S 1/3853; B60S 1/3865; B60S 1/3867; B60S 1/3868; B60S 1/4009; B60S 1/4006
USPC .............................. 15/250.32, 250.43, 250.44
See application file for complete search history.

(56) References Cited

U.S. PATENT DOCUMENTS

| | | | | |
|---|---|---|---|---|
| 8,997,304 B2 * | 4/2015 | Oslizlo | ................... | B60S 1/387 15/250.43 |
| 9,120,463 B2 | 9/2015 | Kim et al. | | |
| 9,884,612 B2 * | 2/2018 | Depondt | ............... | B60S 1/3879 |
| 2012/0180247 A1 * | 7/2012 | Ku | .......................... | B60S 1/3853 15/250.32 |
| 2015/0000065 A1 * | 1/2015 | Lee | ....................... | B60S 1/3851 15/250.32 |
| 2015/0082577 A1 | 3/2015 | Depondt | | |

FOREIGN PATENT DOCUMENTS

| | | |
|---|---|---|
| CN | 105253107 A | 1/2016 |
| CN | 109159760 A | 1/2019 |
| JP | 2003-312451 | * 11/2003 |

OTHER PUBLICATIONS

Search Report dated Oct. 11, 2023 of the corresponding European patent application No. 23167671.9.

* cited by examiner

*Primary Examiner* — Gary K. Graham
(74) *Attorney, Agent, or Firm* — Chun-Ming Shih; HDLS IPR SERVICES

(57) ABSTRACT

This disclosure relates to an assembly structure of a windshield wiper. A base includes a seat and a slot. A seat includes an accommodating space, a plurality of limiting grooves, a fastening portion and an elastic pressing piece. The slot is disposed on a bottom side of the seat for inserting a wiper blade. The linking set includes a seat plate. The seat plate includes a plurality of guiding blocks, a latch and an elastic arm. The latch is obliquely inserted into the seat and rotate to make the seat plate place in the accommodating space. The linking set is pushed by an external force to make the elastic arm move toward the fastening portion. The elastic arm is engaged with the fastening portion and abuts against the elastic pressing piece. The guiding blocks slide into the limiting grooves correspondingly.

10 Claims, 12 Drawing Sheets

ASSEMBLY STRUCTURE OF WINDSHIELD WIPER

BACKGROUND OF THE DISCLOSURE

Technical Field

This disclosure relates a windshield wiper, and more particularly relates to an assembly structure of a windshield wiper.

Description of Related Art

Automotive windshield wiper is mounted on an outer surface of a windshield of a car by connecting a wiper driving arm. The wiper driving arm drives the wiper blade to swing on the windshield.

Moreover, the wiper driving arm is usually embedded on the base of the windshield wiper, and a wiper blade is combined on the bottom surface of the base. Furthermore, there are many types of wiper driving arms designed by different automobile factories to be equipped with various car models. Although there are various designs of windshield wipers on the market, the wiper driving arms of different designs must fit with specific adapters to combine the wiper blades. In this regard, the windshield wipers of the related art need to be equipped with a variety of adapters for assembling different types of windshield wipers. As a result, the overall price of the windshield wiper is increased, and the assembly of the windshield wiper is troublesome.

In view of the above drawbacks, the inventor proposes this disclosure based on his expert knowledge and elaborate researches in order to solve the problems of related art.

SUMMARY OF THE DISCLOSURE

One object of this disclosure is to provide an assembly structure of a windshield wiper, which the linking set is detachably combined with the base to increase the convenience of assembly.

This disclosure is an assembly structure of a windshield wiper including a base and a linking set. The base includes a seat and a slot. The seat includes an accommodating space, a plurality of limiting grooves communicating with the accommodating space, and a fastening portion and an elastic pressing piece located on one side of the accommodating space. The slot is arranged on a bottom side of the seat for inserting a wiper blade. The linking set includes a seat plate. The seat plate includes a plurality of guiding blocks, a latch, and an elastic arm. The latch of the linking set is obliquely inserted into the seat and rotates to make the seat plate place in the accommodating space. The linking set is pushed by an external force to make the elastic arm move toward the fastening portion, so that the elastic arm is engaged with the fastening portion and abuts against the elastic pressing piece, and the plurality of guiding blocks slide into the limiting grooves correspondingly.

In comparison with the related art, the assembly structure of a windshield wiper includes a base and a linking set. The base includes a plurality of limiting grooves, a fastening portion and an elastic pressing piece. Additionally, the linking set includes a plurality of guiding blocks, a latch, and an elastic arm. Therefore, the linking set is combined on the base through the elastic arm abutting against the fastening portion and the guiding blocks sliding into the limiting grooves. Moreover, different types of linking sets may be combined to the base through the arrangement of guiding blocks, the latch, and elastic arms. Therefore, various types of linking sets may be combined to the base in a detachable manner, so as to improve the convenience of assembly and reduce the cost of windshield wipers.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
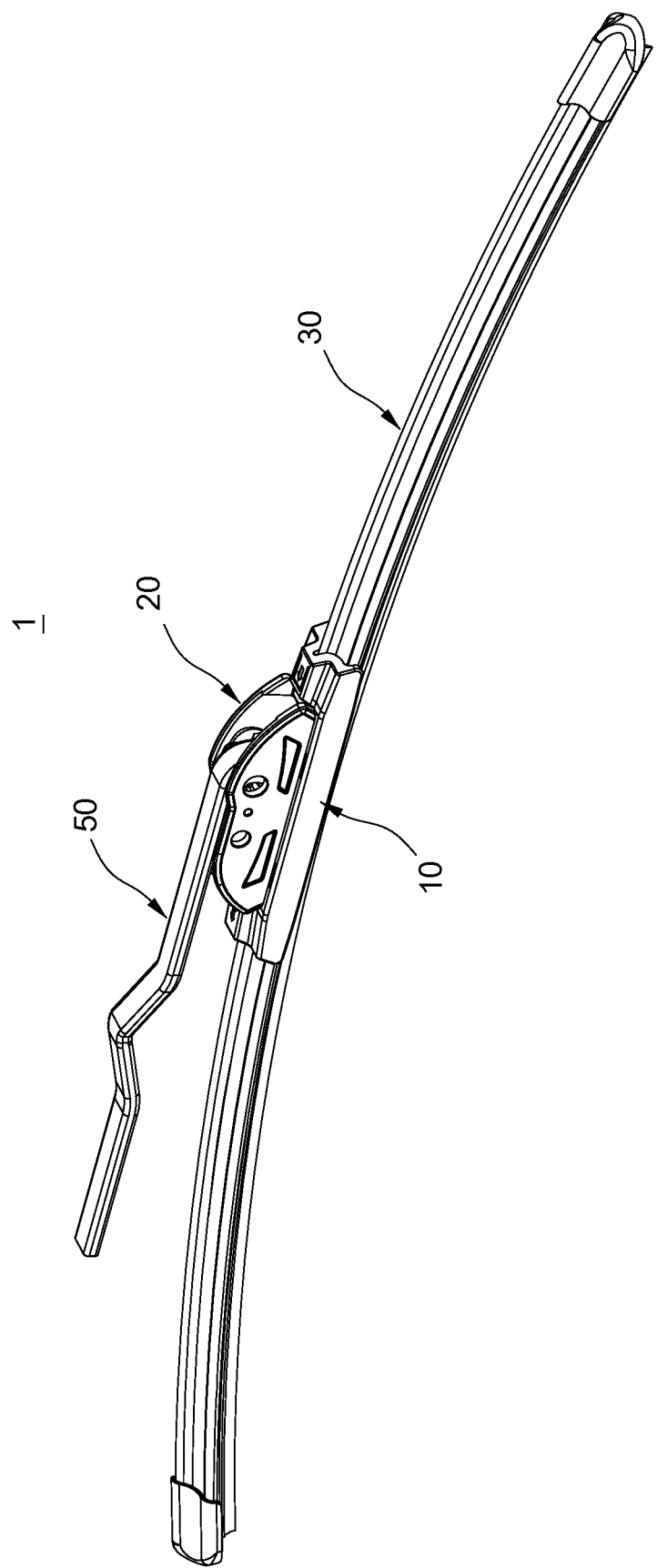
FIG. 1 is a perspective schematic view of the assembly structure of the windshield wiper in this disclosure.
Figure 2:
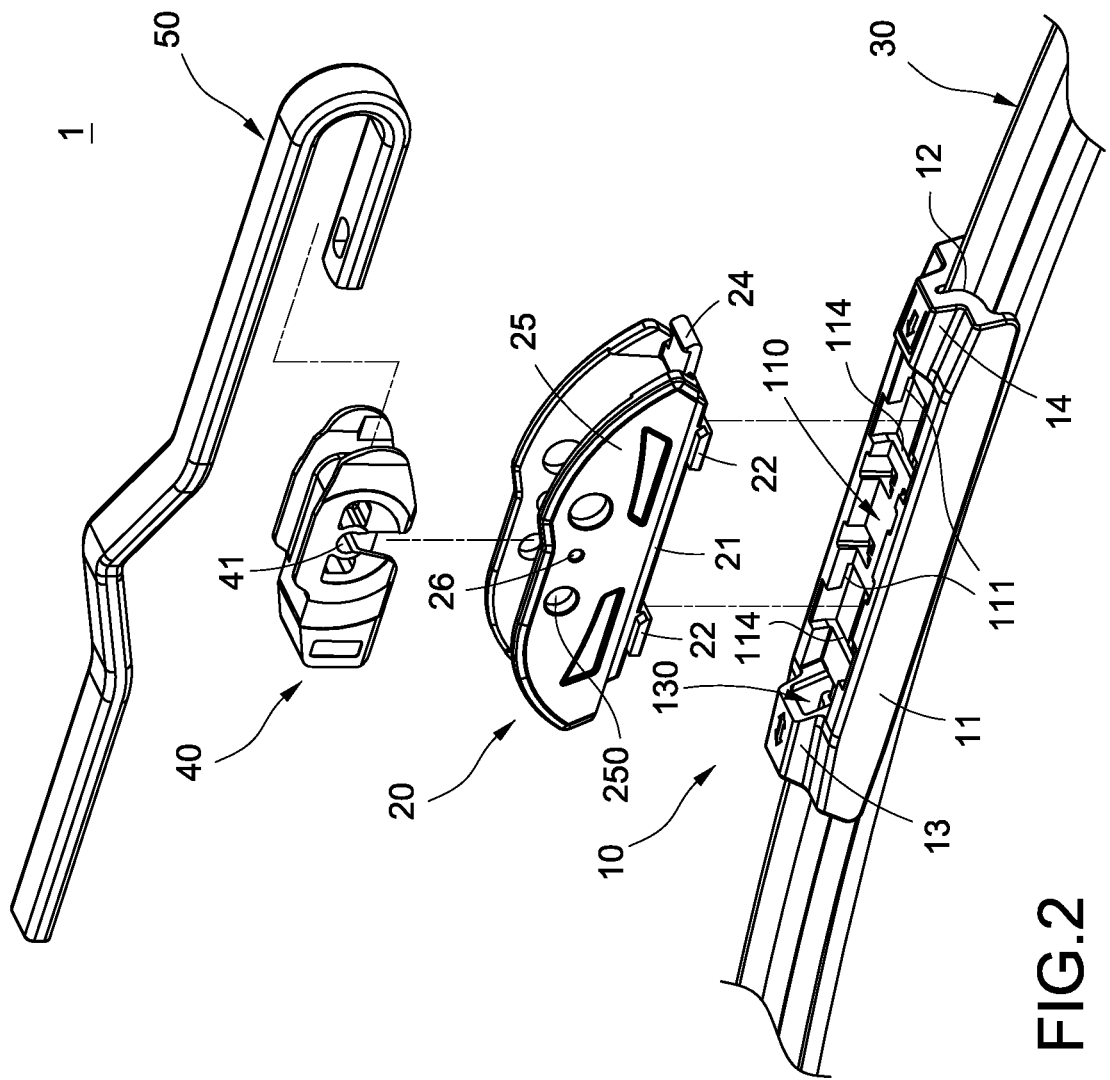
FIG. 2 is a perspective exploded schematic view of the assembly structure of the windshield wiper in this disclosure.
Figure 3:
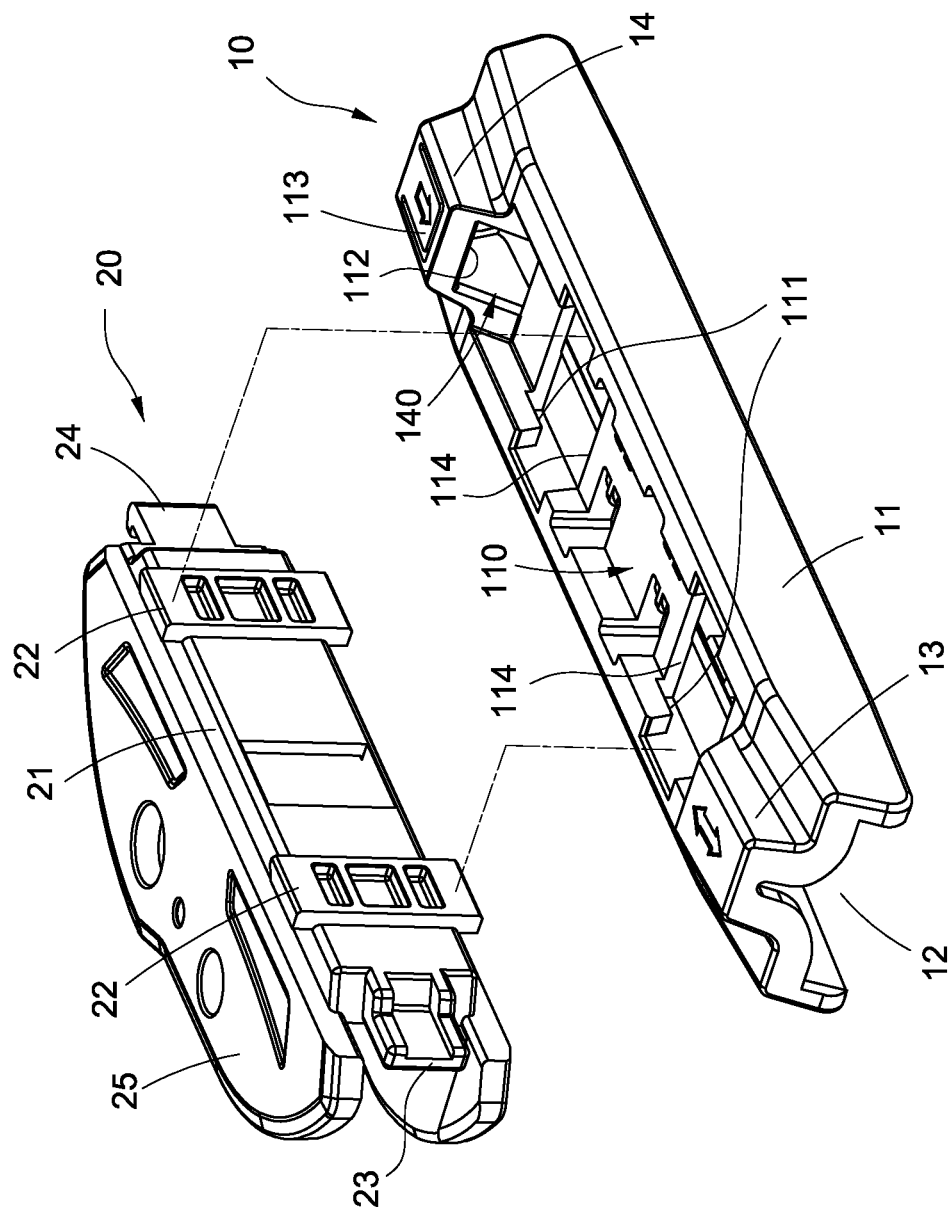
FIG. 3 is a schematic view of the base and the linking set in a combination manner in this disclosure.

Please refer to FIG. 1 to FIG. 3, which are a perspective schematic view of the assembly structure of the windshield wiper in this disclosure, a perspective exploded schematic view of the assembly structure of the windshield wiper in this disclosure, and a schematic view of the base and the linking set in a combination manner in this disclosure. This disclosure is an assembly structure 1 of a windshield wiper. The assembly structure 1 includes a base 10 and a linking set 20, and the linking set 20 is detachably combined with the base 10. More detail of the assembly structure 1 of windshield wiper is as follows.

The base 10 includes a seat 11 and a slot 12. The seat 11 includes an accommodating space 110, a plurality of limiting grooves 111 communicating with the accommodating space 110, and a fastening portion 112 and an elastic pressing piece 113 located on one side of the accommodating space 110. The slot 12 is arranged on a bottom side of the seat 11 for inserting a wiper blade 30.

Specifically, a first platform 13 and a second platform 14 are arranged on two sides of the seat 11 of the base 10 opposite to each other. The first platform 13 includes a first slot 130 communicating with the accommodating space 110. The second platform 14 includes a second slot 140 communicating with the accommodating space 110.

The linking set 20 includes a seat plate 21. The seat plate 21 includes a plurality of guiding blocks 22, a latch 23 and an elastic arm 24. The guiding blocks 22 are located on a bottom side of the seat plate 21. The latch 23 and the elastic arm 24 are located on the seat plate 21 opposite to each other. The linking set 20 includes a pair of wing plates 25 vertically arranged on the side of the seat plate 21 for combining with different types of wiper accessories. Additionally, two ends of the guiding blocks 22 protrude from the pair of wing plates 25.

In this embodiment, the opening size of the first slot 130 is defined corresponding to the width of the latch 23, and the opening size of the second slot 140 is defined corresponding to the width of the elastic arm 24. Furthermore, the elastic pressing piece 113 is disposed on the second platform 14.

In more detail, the seat 11 includes a plurality of guiding grooves 114 arranged spacedly in the accommodation space 110 and located corresponding to the guiding blocks 22. The guiding grooves 114 and the limiting grooves 111 communicate with each other correspondingly. One side of each of the guiding grooves 114 communicates with each of the limiting grooves 111, and an L-shaped groove is defined on an inner wall of the seat 11. Additionally, the linking set 20 includes a pivot portion 26 for being coupled with a coupling base 40, and the pivot portion 26 is disposed between the pair of wing plates 25. In this embodiment, the pivot portion 26 includes a pivot, and the coupling base 40 includes a pivot hole 41. The coupling base 40 is assembled on the linking set 20 through positioning the pivot hole 41 with the pivot portion 26. Accordingly, the coupling base 40 may be combined with a driving arm 50. The driving arm 50 drives the wiper blade 30 to move by the coupling base 40, the linking set 20 and the base 10.

It should be noted that the coupling base 40 is arranged corresponding to the pivoting types of the linking set 20 for combination. Furthermore, the coupling base 40 may be arranged corresponding to different types of driving arms 50. Therefore, the assembly structure 1 of a windshield wiper may be combined with multiple types of driving arms 50 through various types of the linking set 20.

Figure 4:
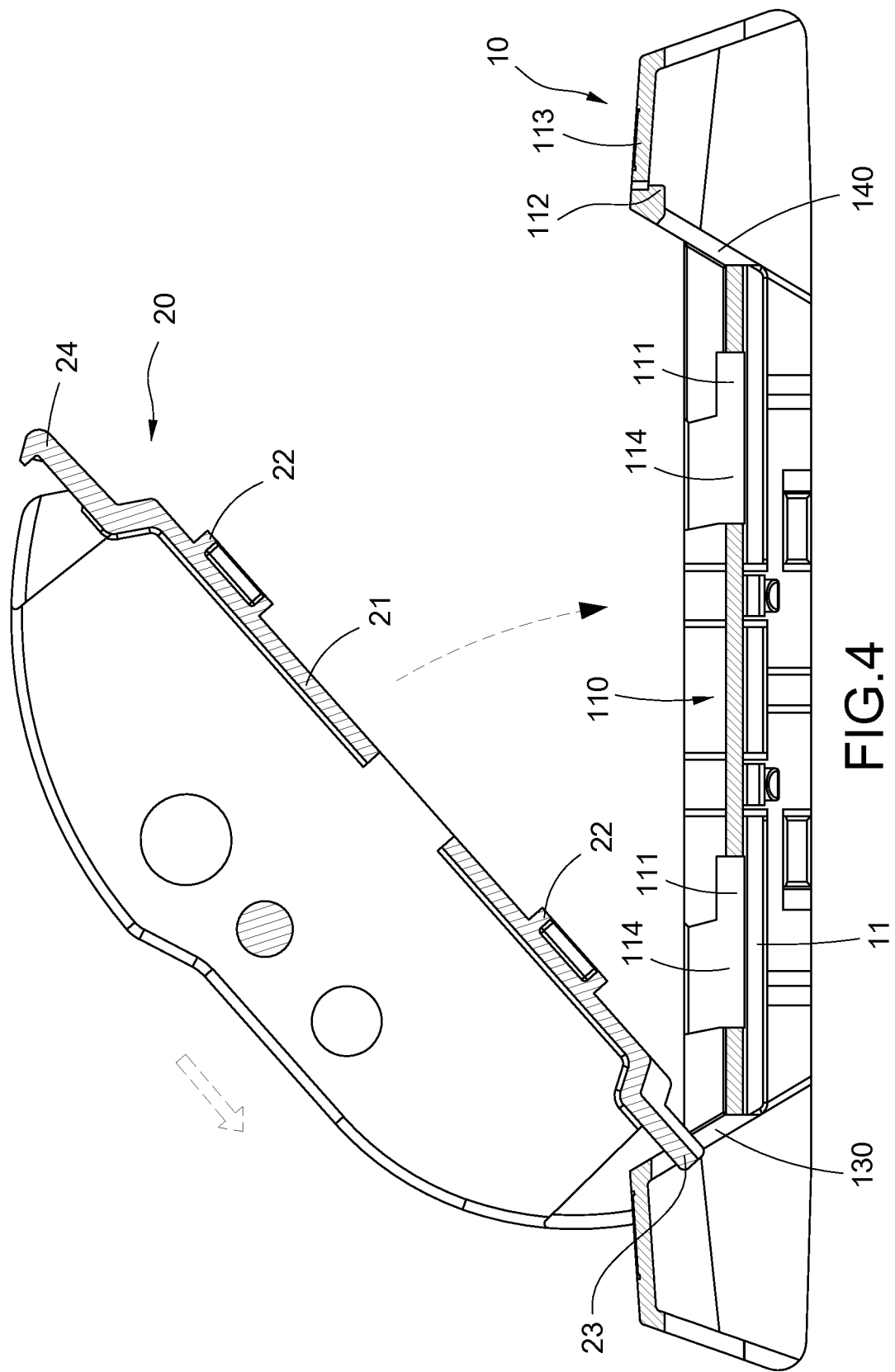
FIG. 4 to FIG. 7 are cross sectional views of the base combining with the linking set in this disclosure.

Please further refer to FIG. 4 to FIG. 7, which are cross sectional views of the base and the linking set in a combination manner in this disclosure. As shown in FIG. 4, the linking set 20 of this disclosure is combined on the base 10 in a detachable manner. When assembling, the latch 23 located on one side of the linking base 20 is obliquely inserted into the first slot 130 of the base 11. Then, the linking base 20 rotates to be placed into the accommodating space 110 of the base 11.

Figure 5:
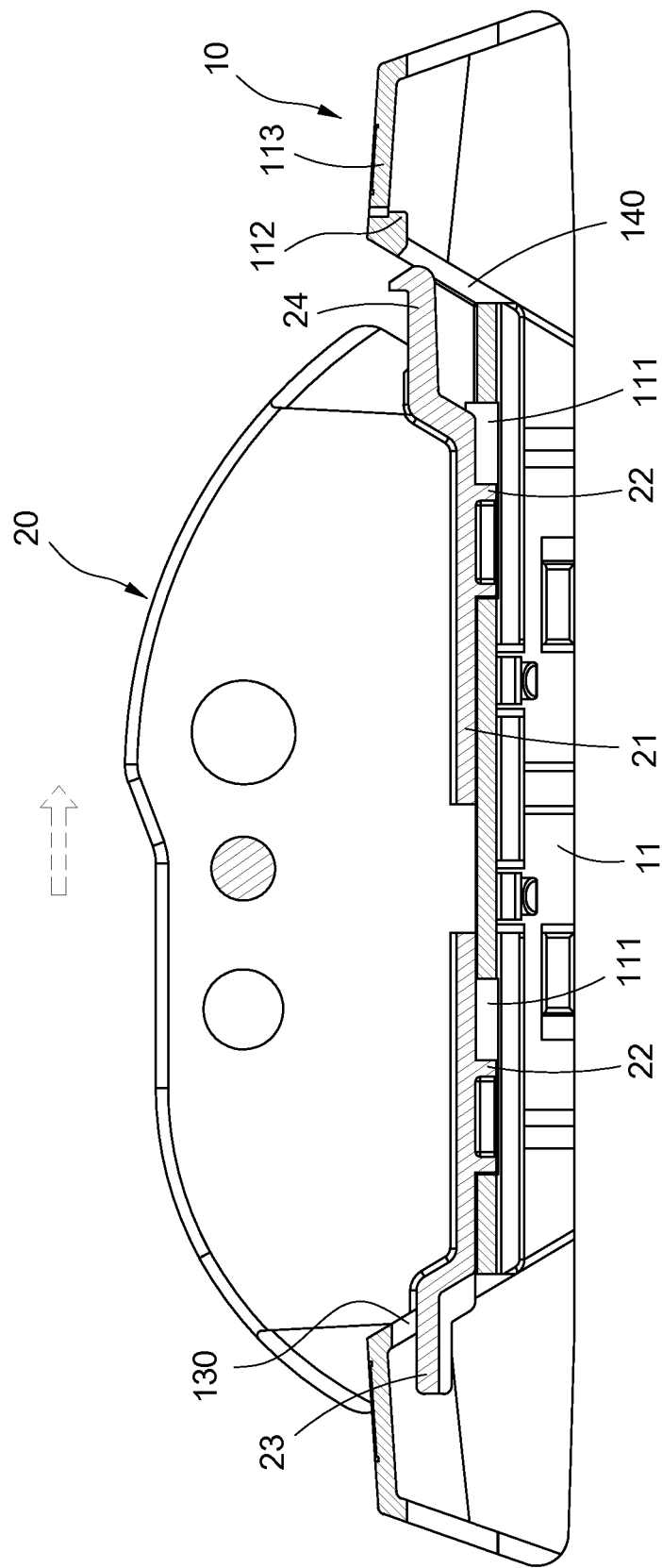
Figure 6:
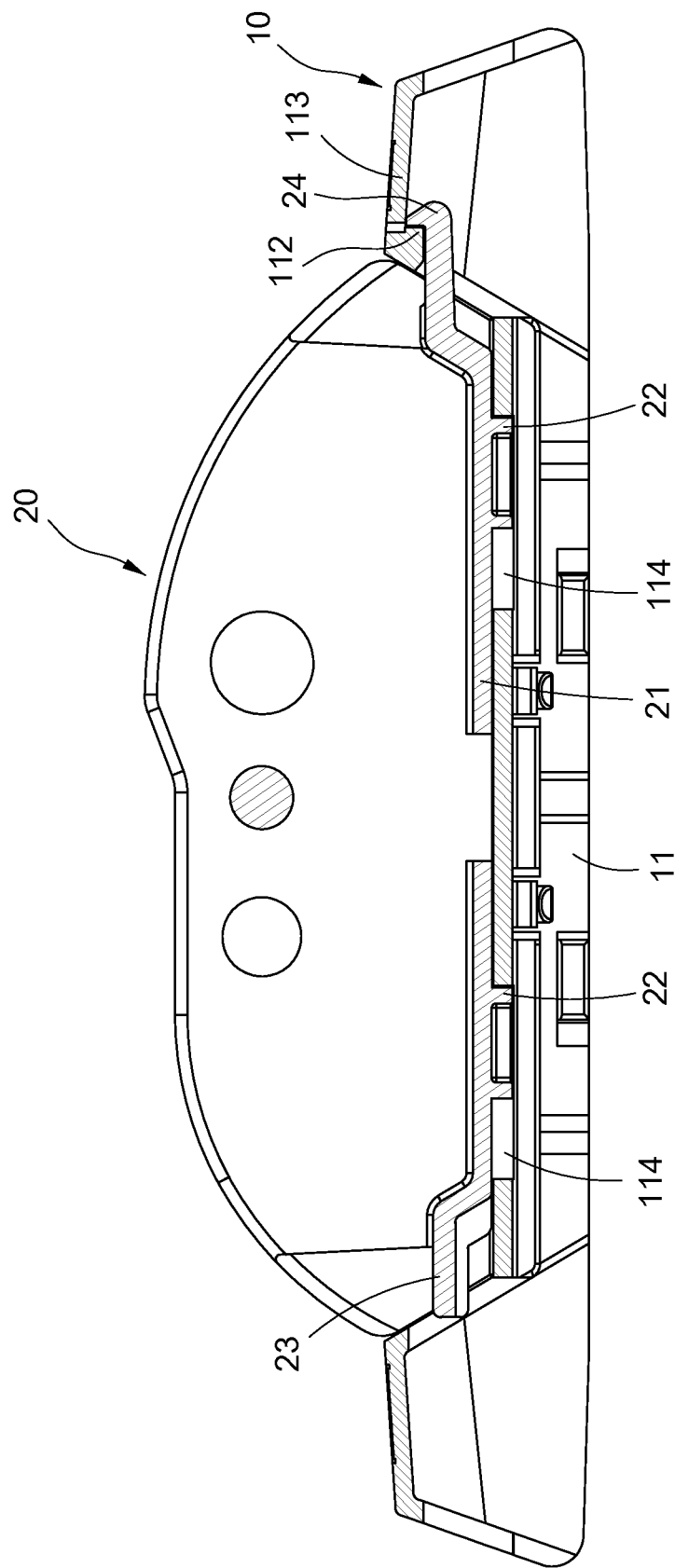
Figure 7:
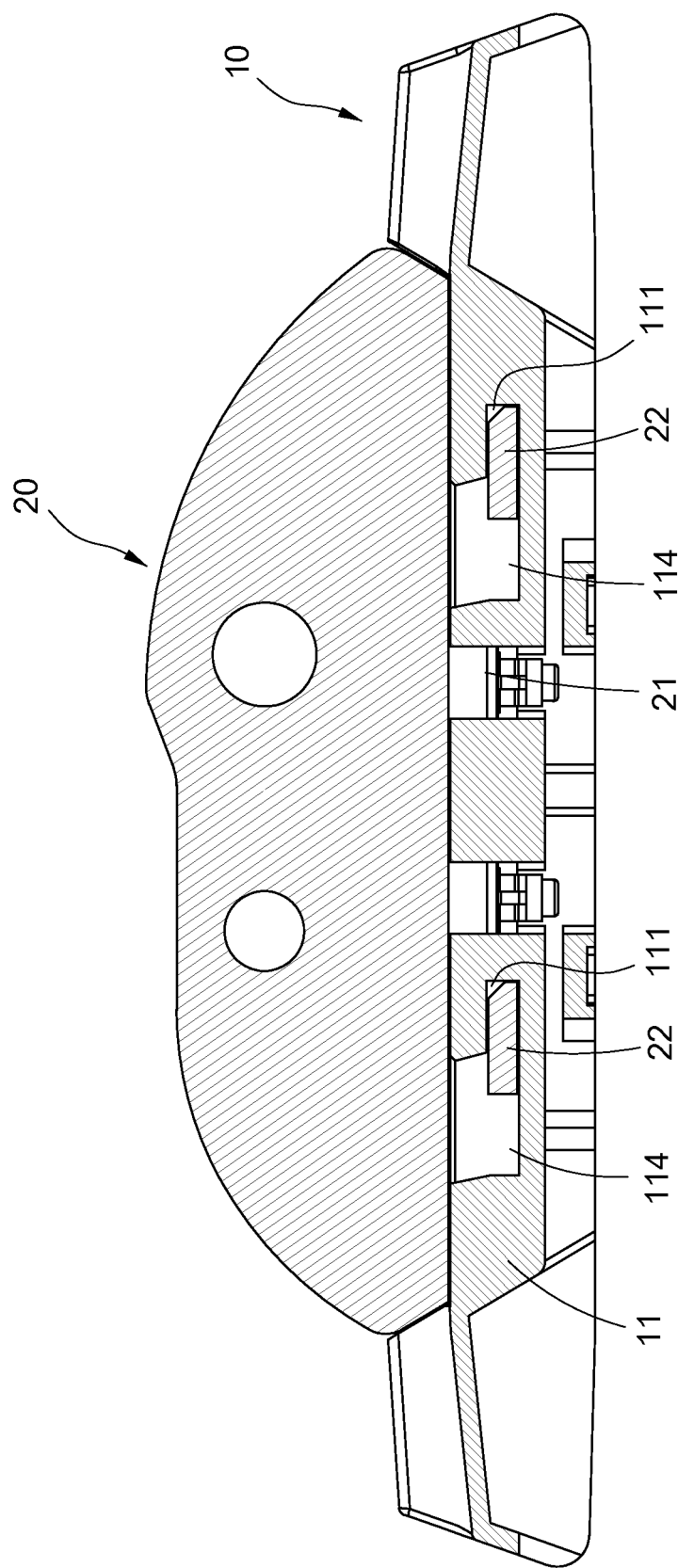

Please refer to FIG. 5, the linking base 20 is pushed by an external force to make the seat plate 21 slide relative to the linking base 20. Additionally, the elastic arm 24 moves toward the fastening portion 112 and shifts into the second slot 140. As shown in FIG. 6 and FIG. 7, the elastic arm 24 is engaged with the fastening portion 112 and abuts against the elastic pressing piece 113, and the plurality of guiding blocks 22 slide into the limiting grooves 111 correspondingly. Therefore, the linking base 20 is coupled to the base 10 through the engagement of the elastic arm 24 and the restriction of the pair of guiding blocks 22.

Figure 8:
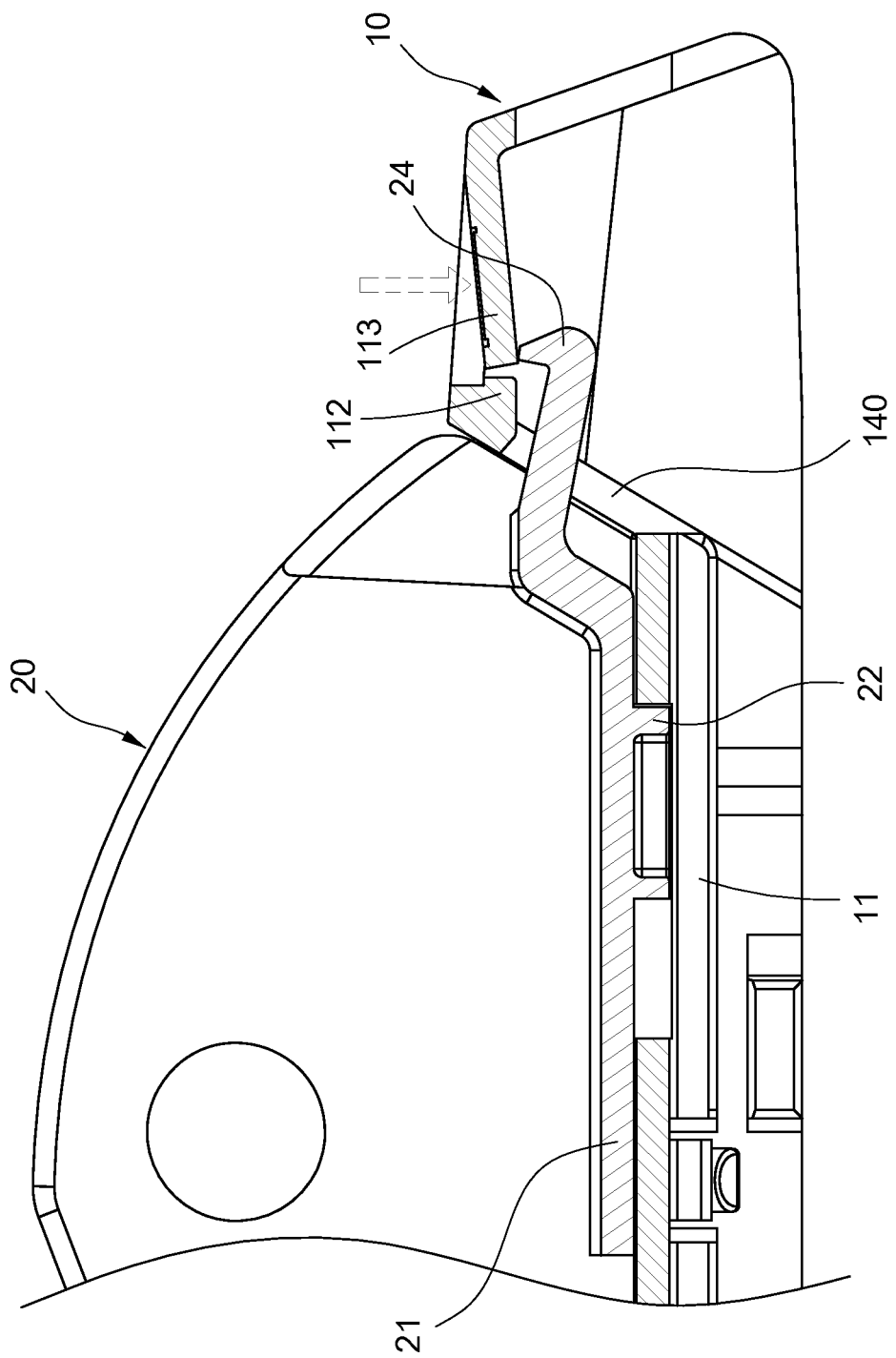
FIG. 8 and FIG. 9 are cross sectional views to show the separation of the base and the linking set in this disclosure.
Figure 9:
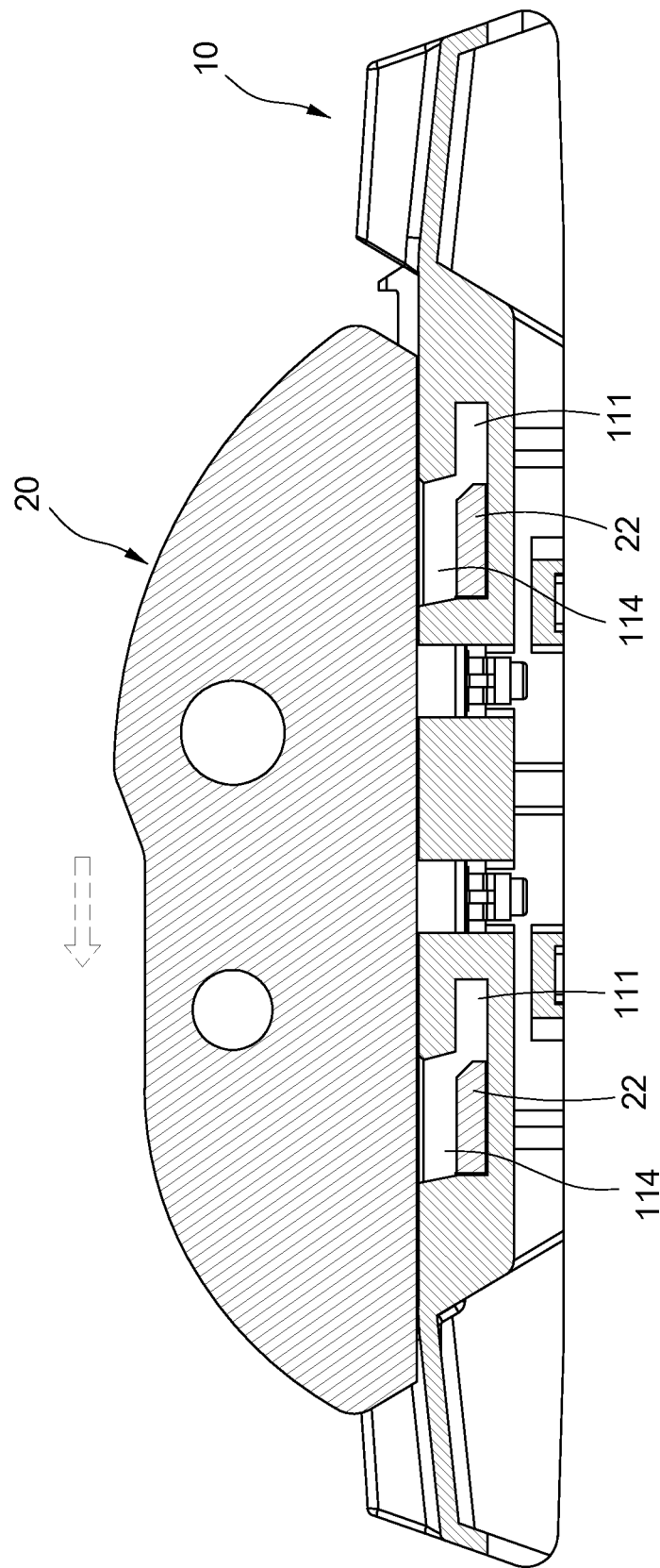

Please further refer to FIG. 8 and FIG. 9, which are cross sectional views to show the separation of the base and the linking set in this disclosure. As show in FIG. 8, the linking base 20 of this disclosure may be detached from the base 10. When detaching the linking base 20, the elastic pressing piece 113 is pressed, and the elastic pressing piece 113 being pressed is elastically deformed to press the elastic arm 24 to escape from the engagement of the fastening portion 112. Please refer to FIG. 9, the linking base 20 is pushed by an external force in the opposite direction, and the seat plate 21 slides relative to the linking base 20 in the opposite direction. Thus, the pair of guiding blocks 22 move out of the limiting grooves 111. Accordingly, the linking base 20 is detached from the base 10.

Figure 10:
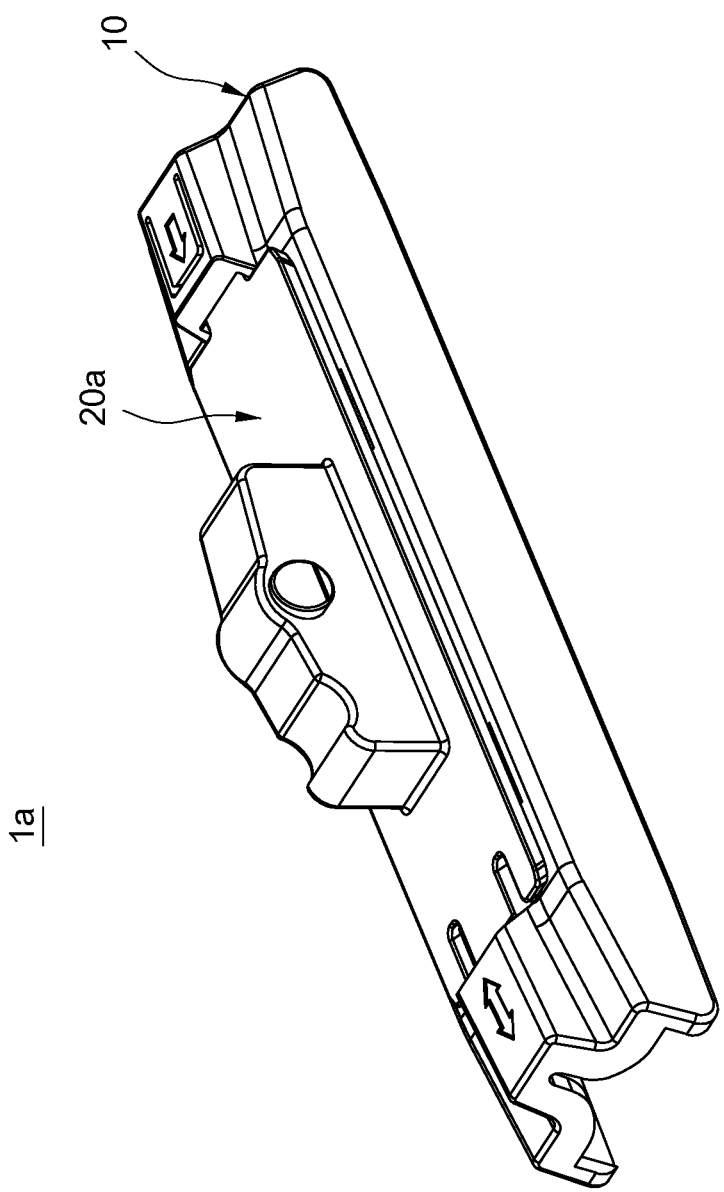
FIG. 10 is a perspective schematic view of the base combining with another linking set in this disclosure.
Figure 11:
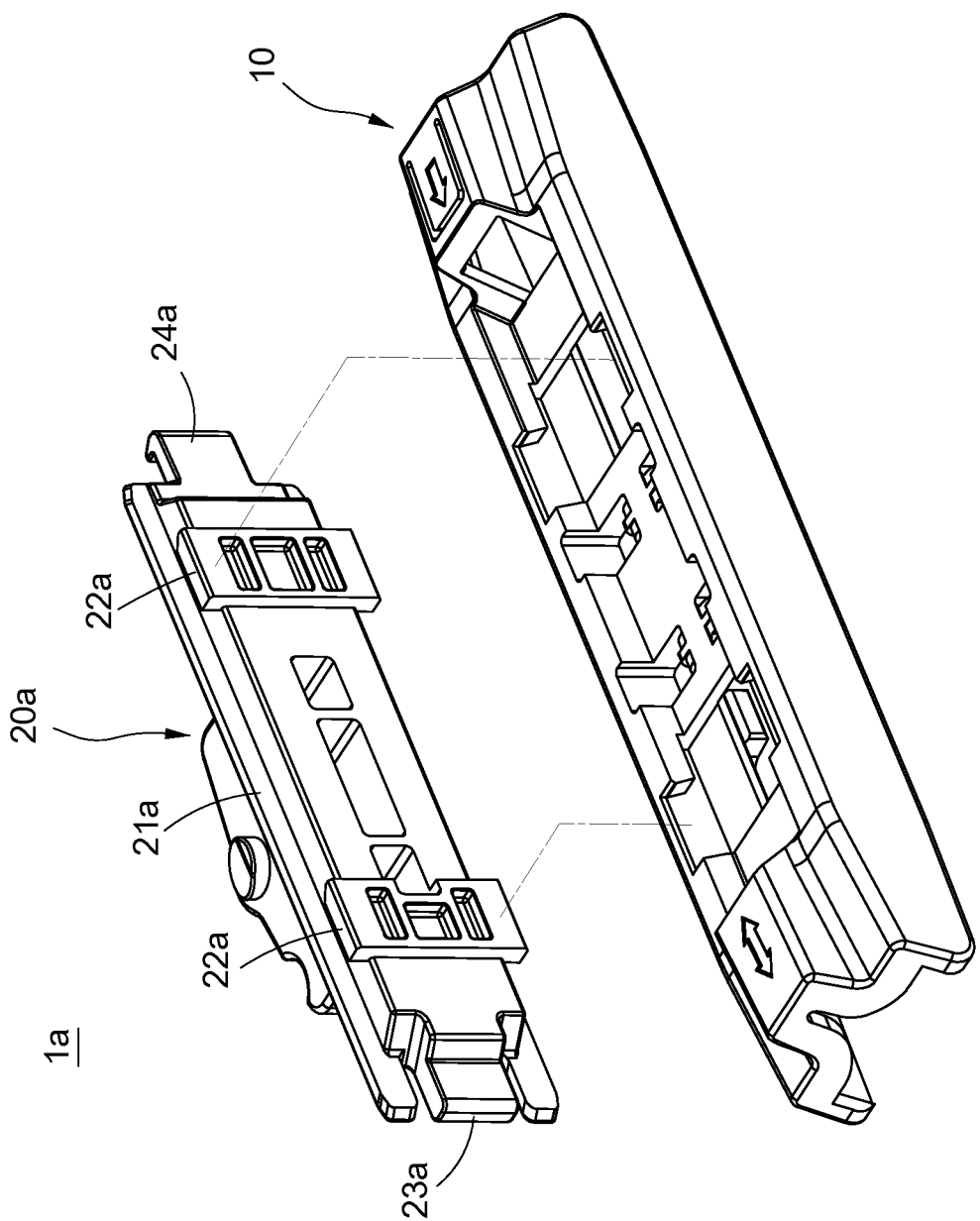
FIG. 11 is a schematic view of the base and another linking set in a combination manner in this disclosure.

Please refer to FIG. 10 and FIG. 11, which are a perspective schematic view and a schematic view of the base and another linking set in a combination manner in this disclosure. In this embodiment, the assembly structure 1a of a windshield wiper includes a base 10 and a linking set 20a. The linking set 20a is combined on the base 10 in a detachable manner. The structure of the base 10 is described as above and here is omitted for brevity. The structure of the linking set 20a is described in detail as follows.

In this embodiment, the linking set 20a includes a seat plate 21a. The seat plate 21a includes a plurality of guiding blocks 22a, a latch 23a and an elastic arm 24a. The guiding blocks 22a are located on the bottom side of the seat plate 21a and protrude from the outer surface of the seat plate 21a. The latch 23a and the elastic arm 24a are located on the seat plate 21a opposite to each other. It should be noted that, in comparison with the previous embodiment, the linking set 20a of this embodiment is not provided with a wing plate. Furthermore, the method of combining the linking set 20a to the base 10 is substantially the same as that of the previous embodiment. The linking set 20a is coupled to the base 10 through the engagement of the elastic arm 24a and the restriction of the pair of guiding blocks 22a.

Figure 12:
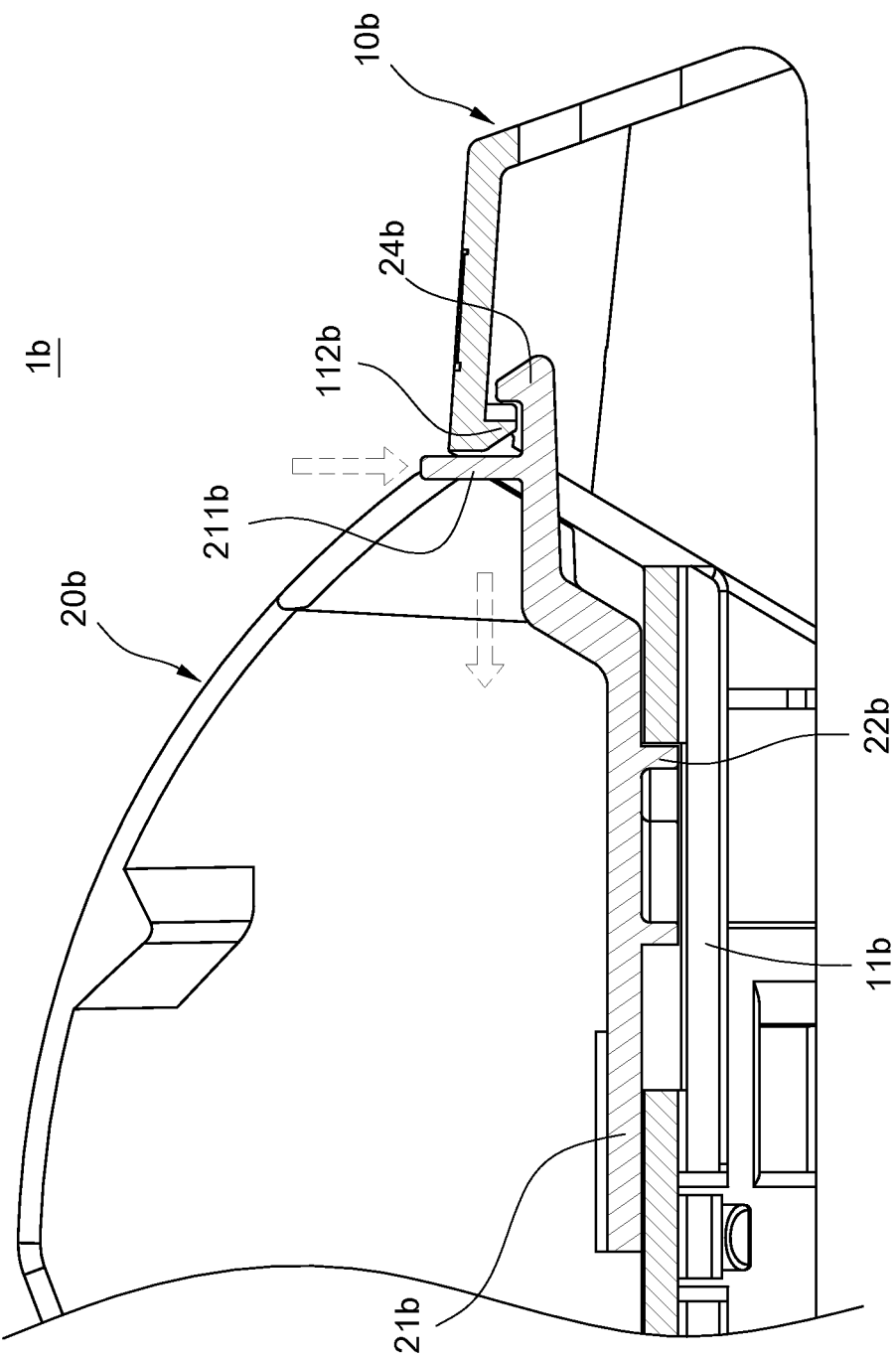
FIG. 12 is a schematic view of the base and still another linking set in a combination manner in this disclosure.

Please further refer to FIG. 12, which is a schematic view of the base and still another linking set in a combination manner in this disclosure. In this embodiment, the assembly structure 1b of the windshield wiper includes a base 10b and a linking set 20b. The base 10b includes a seat 11b and a fastening portion 112b. The linking set 20b includes a seat plate 21b, a plurality of guiding blocks 22b and an elastic arm 24b. It should be noted that the combination of the linking set 20b and the base 10b is the same as that of the previous embodiment, and here is omitted for brevity. The difference of this embodiment is that the linking set 20b includes a pole 211b adjacent to the fastening portion 112b. When detaching the linking base 20b, the pole 211b is pressed first, and then the pole 211b is pulled, so that the elastic arm 24b escapes from the engagement and position of the fastening portion 112b. Then follow the aforementioned method to detach the linking set 20b from the base 10b under an external force in the opposite direction.

While this disclosure has been described by means of specific embodiments, numerous modifications and variations could be made thereto by those skilled in the art without departing from the scope and spirit of this disclosure set forth in the claims.

What is claimed is:

1. An assembly structure of a windshield wiper, the assembly structure comprising:
   a base, comprising a seat and a slot, the seat comprising an accommodating space, a plurality of limiting grooves communicating with the accommodating space, and a fastening portion and an elastic pressing piece located on one side of the accommodating space, wherein the slot is arranged on a bottom side of the seat, and a wiper blade is inserted in the slot; and
   a linking set, comprising a seat plate, the seat plate comprising a plurality of guiding blocks, a latch and an elastic arm;
   wherein, the latch of the linking set is obliquely inserted into the seat and configured to rotate to make the seat plate be accommodated in the accommodating space; when the linking set is pushed, the elastic arm moves toward the fastening portion to be engaged with the fastening portion and abut against the elastic pressing piece, and the plurality of guiding blocks slide into the limiting grooves correspondingly.

2. The assembly structure according to claim 1, wherein the seat comprises a first platform and a second platform arranged on two sides thereof opposite to each other, the first platform comprises a first slot communicating with the accommodating space, the second platform comprises a second slot communicating with the accommodating space, the latch is inserted in the first slot, and the elastic arm is inserted in the second slot.

3. The assembly structure according to claim 2, wherein the elastic pressing piece is disposed on the second platform.

4. The assembly structure according to claim 2, wherein an opening size of the first slot is defined corresponding to a width of the latch, and an opening size of the second slot is defined corresponding to a width of the elastic arm.

5. The assembly structure according to claim 1, wherein the seat comprises a plurality of guiding grooves arranged spacedly in the accommodation space corresponding to the guiding blocks, and the guiding grooves communicate with the limiting grooves respectively.

6. The assembly structure according to claim 5, wherein one side of each of the guiding grooves communicates with each of the limiting grooves, and an L-shaped groove is defined on an inner wall of the seat.

7. The assembly structure according to claim 1, wherein the linking set comprises a pair of wing plates vertically arranged on one side of the seat plate, and two ends of each guiding block are disposed protrusively from the pair of wing plates.

8. The assembly structure according to claim 7, wherein the linking set comprises a pivot portion coupled with a coupling base, the pivot portion is disposed between the pair of wing plates, and the pair of wing plates comprises a plurality of coupling holes arranged in pairs.

9. The assembly structure according to claim 1, wherein the guiding blocks are located on a bottom side of the seat plate and disposed protrusively from an outer surface of the seat plate.

10. The assembly structure according to claim 1, wherein the linking set comprises a pole disposed adjacent to the fastening portion.

* * * * *